(12) United States Patent
Browne et al.

(10) Patent No.: US 8,109,318 B2
(45) Date of Patent: Feb. 7, 2012

(54) METHODS OF DEPLOYING A COVER UTILIZING ACTIVE MATERIAL AND AN EXTERNAL HEAT SOURCE

(75) Inventors: Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 777 days.

(21) Appl. No.: 12/059,861

(22) Filed: Mar. 31, 2008

(65) Prior Publication Data

US 2009/0072575 A1   Mar. 19, 2009

Related U.S. Application Data

(63) Continuation-in-part of application No. 11/856,744, filed on Sep. 18, 2007.

(51) Int. Cl.
*E60J 3/02* (2006.01)
(52) U.S. Cl. .................. 160/370.22; 160/1; 160/405
(58) Field of Classification Search ............ 160/370.22, 160/1, 7, 274, 310, 312, 317, 405; 296/97.8, 296/97.4
See application file for complete search history.

(56) References Cited

U.S. PATENT DOCUMENTS

| | | | | | |
|---|---|---|---|---|---|
| 3,204,690 | A | * | 9/1965 | Nyc | 160/176.1 R |
| 5,076,633 | A | * | 12/1991 | Hsu et al. | 296/97.4 |
| 5,107,916 | A | * | 4/1992 | van Roermund et al. | 160/6 |
| 5,133,585 | A | * | 7/1992 | Hassan | 296/97.5 |
| 5,396,769 | A | * | 3/1995 | Brudnicki | 60/528 |
| 5,762,393 | A | | 6/1998 | Darmas, Sr. | |
| 5,816,306 | A | * | 10/1998 | Giacomel | 160/6 |
| 6,006,522 | A | * | 12/1999 | Foss et al. | 60/528 |
| 2002/0033616 | A1 | * | 3/2002 | Schlecht et al. | 296/138 |
| 2007/0210606 | A1 | * | 9/2007 | Alacqua et al. | 296/97.8 |

FOREIGN PATENT DOCUMENTS

| | | | |
|---|---|---|---|
| EP | 1830064 A1 | * | 9/2007 |
| JP | 62006824 A | * | 1/1987 |

* cited by examiner

*Primary Examiner* — David Purol

(57) ABSTRACT

Methods of deploying and stowing a cover coupled to an actuator comprising active material, includes the steps of heating the material with an external heat source, so as to cause a change in physical property and deploying the cover due to the change, and preferably includes accelerating the heating of the material by focusing the energy of the source with a lens or prism, engaging the cover with an input device and retracting the cover upon input, releasing stored energy as a result of the change, or further deploying the cover by use of a ratcheting mechanism, use of a timer for delayed actuation, use of a sensor configured to determine a condition, such as an opened door or the presence of an occupant, interconnecting to a windshield wiper, immersing the actuator in a heated fluid, and conduction heating the actuator through contact with a heated panel.

4 Claims, 4 Drawing Sheets

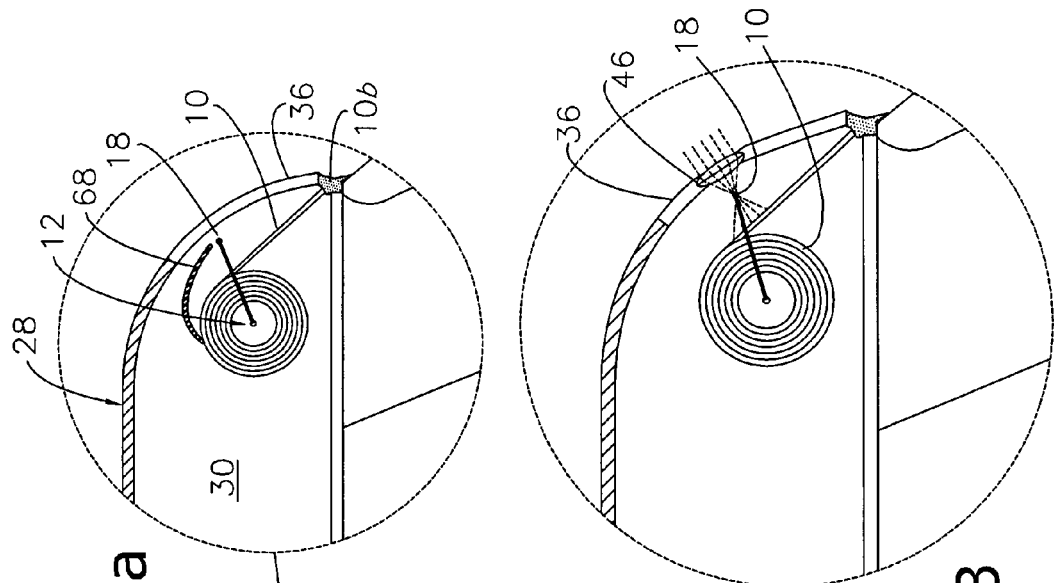
FIG. 2a
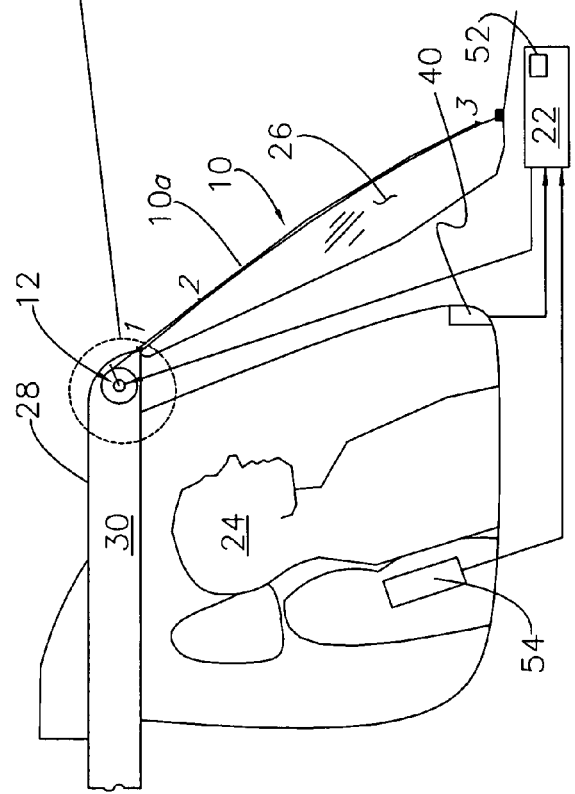
FIG. 3
FIG. 2

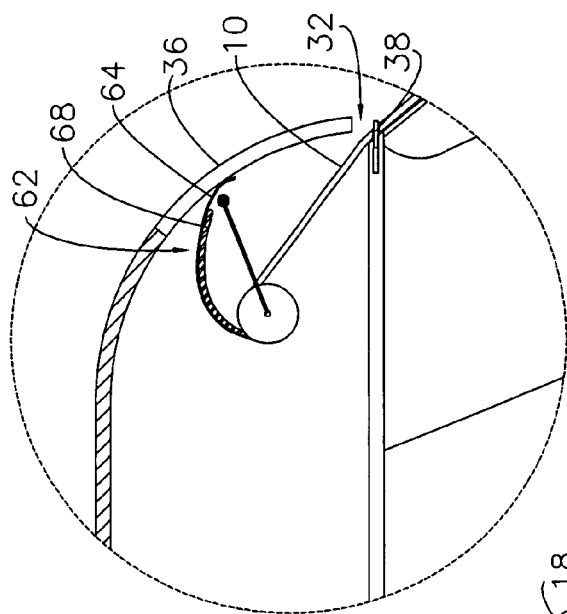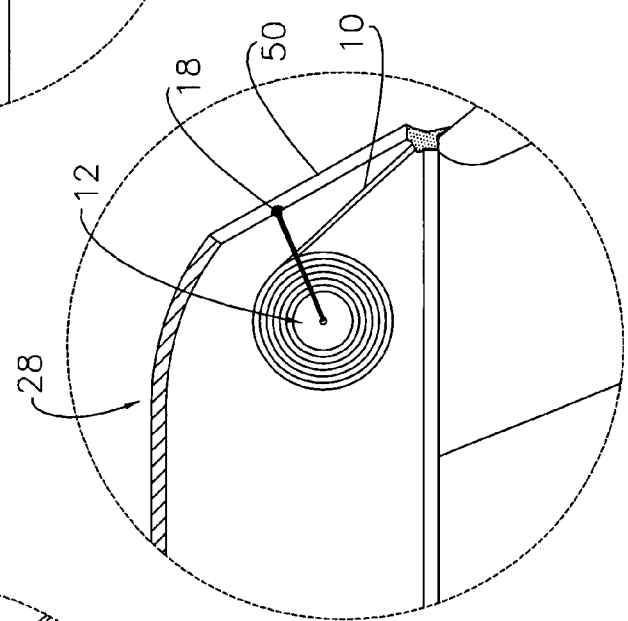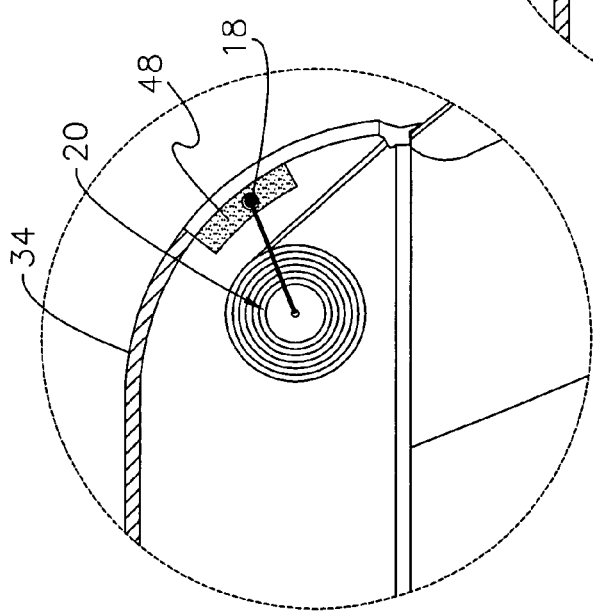

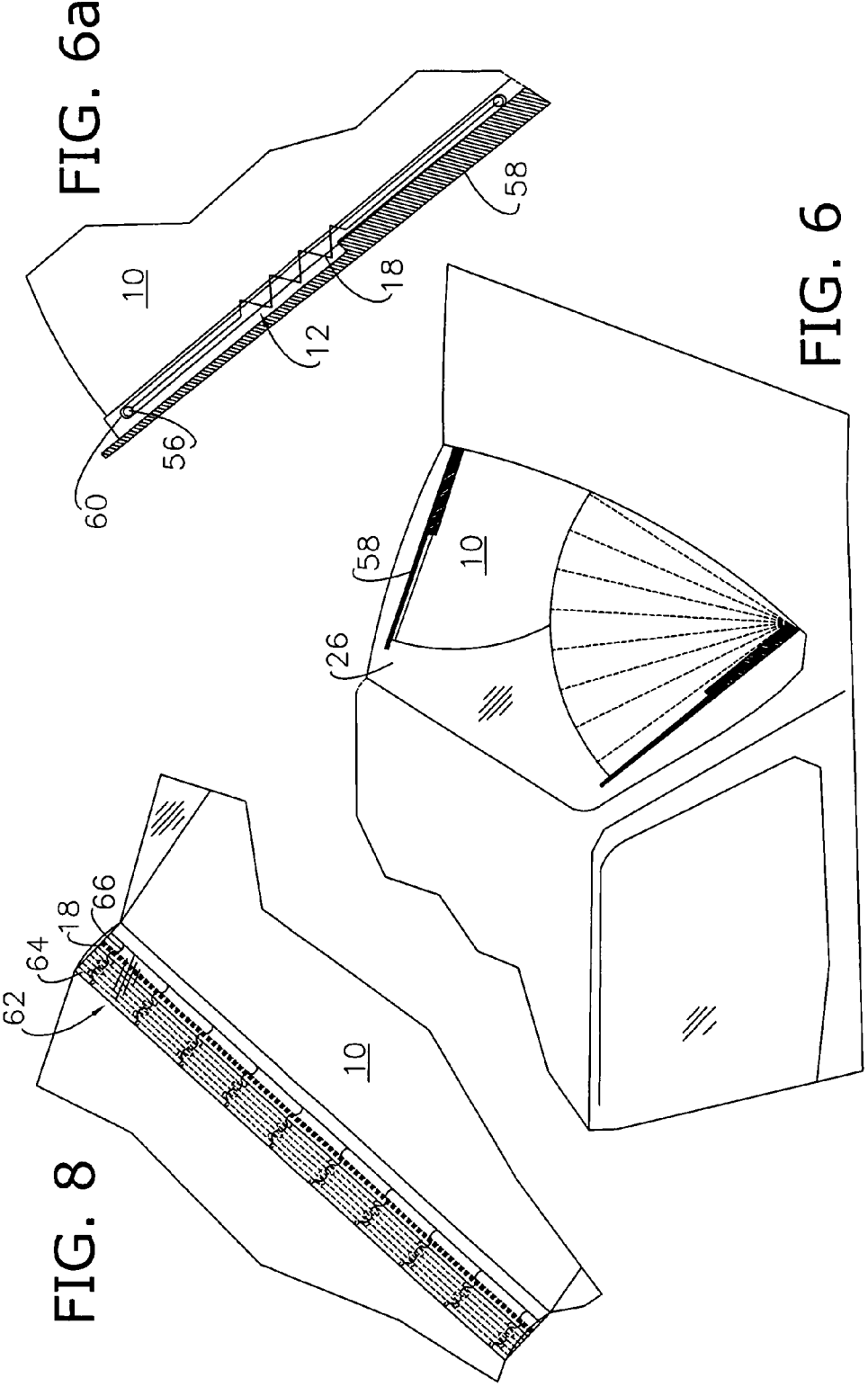

METHODS OF DEPLOYING A COVER UTILIZING ACTIVE MATERIAL AND AN EXTERNAL HEAT SOURCE

CROSS-REFERENCES TO RELATED APPLICATIONS

This U.S. Non-Provisional patent application is a continuation-in-part and claims the benefit of U.S. Non-Provisional application Ser. No. 11/856,744 filed on Sep. 18, 2007, entitled ACTIVE MATERIAL ACTIVATED COVER (hereinafter the 744-Application), and incorporated by reference herein.

BACKGROUND

1. Field of the Invention

The present disclosure relates to methods of deploying sunshades, covers, screens, partitions, blinds, and the like (collectively referred to herein as "covers"), and more particularly, to methods of deploying and retracting a cover having an active-material based actuator utilizing an external heat source.

2. Discussion of Prior Art

A variety of covers have long been developed to serve as barriers to heat energy and/or to direct exposure to variously the IR, UV, and visible portions of the solar spectrum. Methods of deploying these covers have likewise been developed to facilitate deployment and increase effectiveness. However, various concerns relating to conventional covers remain in the art. In automotive settings, for example, inside cover designs are typically deployed manually, thereby requiring the presence of an occupant. Where an occupant is not present, the cover cannot be deployed. As a result, excessive temperature rise (and direct exposure of interior surfaces to solar radiation) in parked vehicles due to solar energy passing through glazing often occur rapidly, resulting at least in an unpleasant situation upon vehicle entry and more rapid degradation of UV sensitive interior materials. More recently, covers placed inside of vehicles have also exhibited automatic deployment, which reduces operation time and effort. These types of covers, however, add weight, volume, cost, and noise, and increase the likelihood of failure. Moreover, the electro-mechanical motors involved with conventional automatic deployment present concerns, including those related to upkeep, repair and replacement, the generation of noise during deployment and retraction, and the establishment of an additional battery load.

Similarly, outside sunshades that typically overlay an entire glazing region, such as the front windshield, have long been utilized to block the infiltration of radiant heat energy from the sun. Concerns remain here as well, however, as the manual deployment and stowing of these larger shades take even more time, are inconvenient, and when not in use require significant storage space.

Thus, for these reasons and more, covers have been largely ineffective and under-utilized. As such, there is a need in the art for an improved method of deploying and stowing covers.

BRIEF SUMMARY

Responsive to this need, improved methods of deploying and stowing a cover that addresses the afore-described concerns are provided by the present invention. Among other things, the methods are useful for providing an automatic modus for deploying and retracting the cover that does not require the presence of an occupant or user.

The invention is further useful for accomplishing the translation of the cover without the use of electro-mechanical, electromagnetic, or electro-hydraulic means, which saves energy and/or extends battery life. More particularly, the invention utilizes the natural reaction of active materials to undergo a change when exposed to an outside stimulus or activation signal to effect the deployment and retraction of the cover.

The invention is yet further useful for utilizing an external heat source, such as direct solar heating, to drive the active-material based actuator. This results in a smart system, wherein the cover is selectively deployed only in conditions most requiring of its use. The use of sensors or feedback to accomplish selective deployment is therefore not required.

The method generally includes the step of securing the cover relative to the source such that at least a portion of the actuator is exposed and thermally coupled to the source. At this step, the actuator presents a first temperature. Next, the portion is heated with the heat source, so as to achieve a second temperature whereat the actuator is caused to undergo a change in physical property. Finally, the cover is deployed as a result of the change, when the second temperature is achieved. Thus, it is understood and appreciated that the present invention provides a number of advantages over manually and electro-mechanically/magnetically/hydraulically deployed prior art systems.

Further inventive methods of deploying and stowing the cover involving releasing stored energy, applying a delay period, and employing a locking pin, ratcheting mechanism, or obscuring element are presented herein, with reference to the 744-Application. The above described and other features are exemplified by the following figures and detailed description.

BRIEF DESCRIPTION OF THE DRAWINGS

Preferred embodiments of the invention are described in detail below with reference to the attached drawing figures, wherein:

FIG. 2 is a cross-sectional elevation of a cover adapted to overlay the front windshield of a vehicle in accordance with a preferred method of the invention, and further illustrating an interior compartment sensor configured to detect the presence of an occupant and a controller communicatively coupled to the cover;

FIG. 2a is an enlarged inset of the cover shown in FIG. 2, particularly illustrating an active material (AM) wire and associated vehicle structure;

FIG. 3 is an enlarged inset of the cover shown in FIGS. 2 and 2a, wherein the heat energy of the source is focused by a lens prior to heating the wire, in accordance with a preferred method of the present invention;

FIG. 4 is an enlarged inset of the cover shown in FIGS. 2 and 2a, wherein the wire is immersed in a fluid exposed to the heat source, in accordance with a preferred method of the present invention;

FIG. 5 is an enlarged inset of the cover shown in FIGS. 2 and 2a, wherein the wire contacts a panel exposed to the heat source, in accordance with a preferred method of the present invention;

FIG. 6 is a perspective view of a cover overlaying the front windshield of a vehicle by selective attachment to and deploying of the windshield wipers, in accordance with a preferred method of the presenting invention;

FIG. 6a is an enlarged perspective view of a wiper and cover shown in FIG. 6, particularly illustrating the actuator and attachment mechanism;

FIG. 7 is an enlarged inset of the cover shown in FIGS. 2 and 2a, wherein the cover is in the third position and an obscuring element is deployed to block the exposure of the wire to the source, in accordance with a preferred method of the present invention; and FIG. 8 is an enlarged front elevation view of the element shown in FIG. 7, particularly illustrating an accordion structure having interwoven longitudinal active-material strands configured to retract the element, so as to re-expose the wire when heated, in accordance with another preferred method of the present invention.

DETAILED DESCRIPTION

Figure 1:
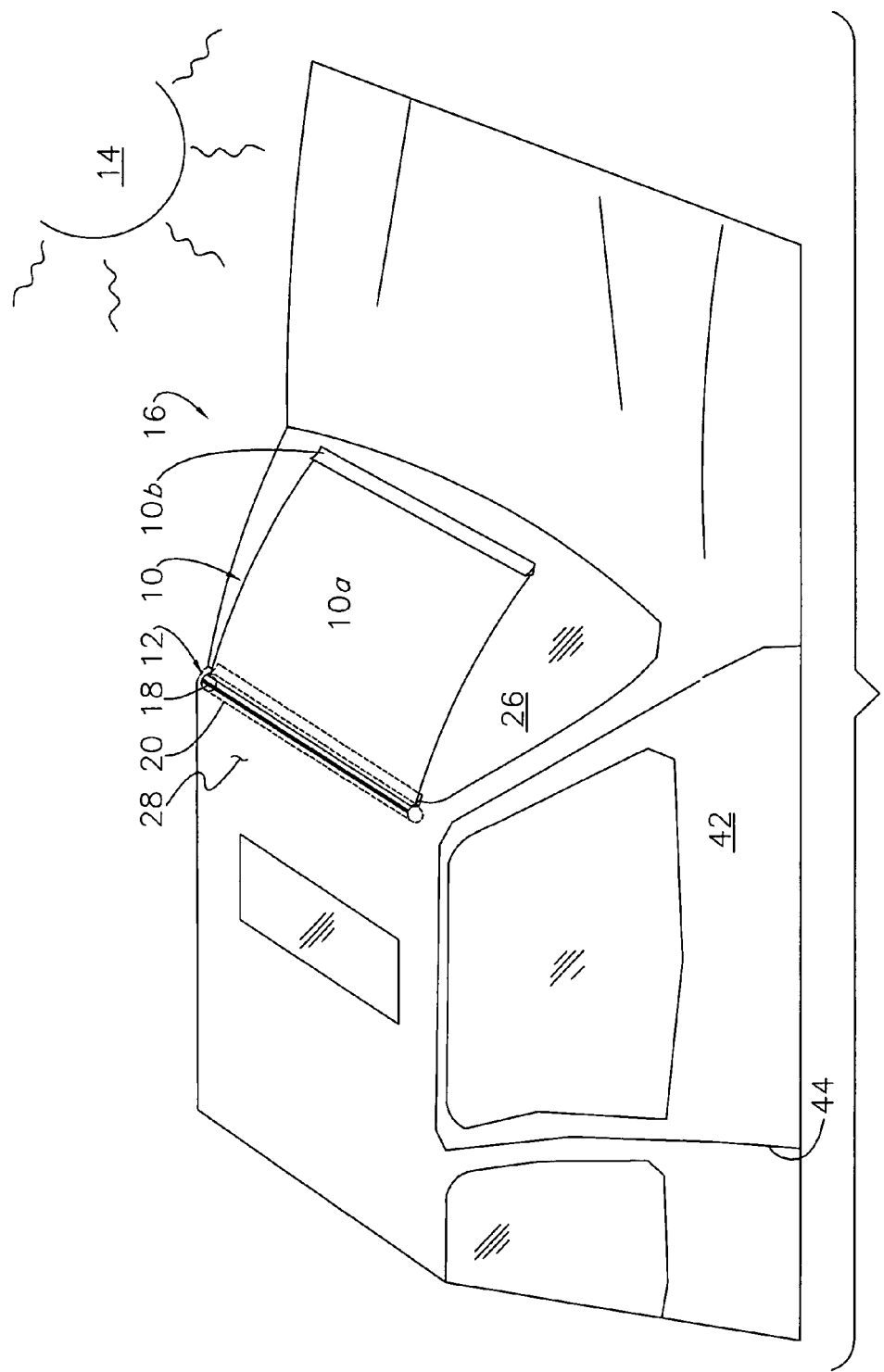
FIG. 1 is a perspective view of a deployed cover having an active-material based actuator being driven by an external heat source and utilized in conjunction with a vehicle glazing, in accordance with a preferred method of the present invention.

As best shown in FIG. 1, the present invention involves methods of deploying and stowing a cover 10 coupled to and driven by an active-material based actuator 12, utilizing an external heat source 14 (i.e., a source of heat energy physically detached from but thermally coupled to the actuator). The term "stowing" as used herein shall mean retracting and storing the cover once deployed. It is appreciated that the inventive methods of operation disclosed herein are employable by select active-material based actuators, including those embodiments described and illustrated in the 744-Application. As such a detailed description of the configuration of the actuator 12 will not be repetitively provided herein.

The following description of preferred methods of employing these actuators with respect to an external heat source is merely exemplary in nature and is in no way intended to limit the disclosure. Although described here with respect to a vehicle 16, such as an automobile, it is appreciated that the benefits of the present invention can be utilized in other settings wherein utilizing an external heat source to deploy a cover more efficiently and reliably is desired. For example, the inventive methods may be utilized in conjunction with the glazings of residential or commercial structures. The term "covers" is not limited to the embodiments illustrated herein, and as previously stated shall include sunscreens, sun sheets, sunshades, interfering window slats (also know as "blinds"), covers (e.g., cargo bed cover, storage well/bin cover, and glazing area cover), partitions (e.g., screening, security, protective, and privacy), barriers (e.g., sound, thermal, light, fluid (e.g., moisture, gas, liquid), and/or weather), and the like.

In the illustrated embodiments, the cover 10 is disposed near a glazing (e.g., window, sunroof, windshield, etc.), and the active-material based actuator 12 is in operable communication with the cover 10 (FIGS. 1 and 2). The inventive methods employ the reversible shape, stiffness, and/or shear strength change capabilities of different classes of "active materials" to deploy and/or stow the cover 10 utilizing large displacements. The term "active-material based actuator" shall mean an actuator of the cover whose primary function is driven by a change in at least one active material, wherein the term "active material" shall be given its ordinary meaning as understood by those skilled in the art. In the present invention, the actuator 12 includes a heat responsive active material (AM) element 18, such as a shape memory alloy (SMA), shape memory ceramic (SMC), or thermoresponsive shape memory polymer (SMP) wire. The term "wire" is meant to encompass a range of geometric forms such as strands, strips, bands, cables, sheets, slabs, etc. A detailed explanation of these and other suitable active materials can be found in the 744-Application, and as such will not be repetitively provided here.

More particularly, the cover 10 is configured to overlay a surface or bifurcate a three-dimensional space when deployed. More preferably, the cover 10 is configured to block heat transfer (or direct exposure to solar rays of) from the surface or a portion of the space, and as such preferably presents a planar member having a reflective exterior layer 10a. The preferred cover 10 is flexible or pliable so as to be rolled or folded to facilitate storage. For example, as shown in the illustrated embodiment, the cover 10 may be configured so that the actuator 12, when activated, can deploy the cover 10 from a housing 20, such as a scroll whereupon the cover 10 is rolled, and across at least a portion of the desired area. In a preferred method, the cover 10 may be deployed to a partially deployed condition (position 2, FIG. 2), so as to enable the operation of the vehicle 16. Where used as a sunshade, however, the cover 10 and glazing area are cooperatively configured so that a majority portion and more preferably at least 75% of the area is covered (FIG. 1).

As shown in FIG. 2, a controller 22 is preferably intermediately coupled to the element 18 and cover 10. The actuator 12 may further comprise or be spaced from the controller 22. The controller 22 is programmably configured so as to autonomously effect the steps of the various methods described herein, and as such, includes sufficient software, processing and storage capabilities, as are readily determinable by those of ordinary skill in the art. The preferred controller 22 is adjustably configured, such that an occupant or user 24 is able to select one of a plurality of modes of operation.

Returning to FIG. 1, the external heat source 14 may be represented by the Sun, which emits radiation across most of the electromagnetic spectrum; however, it is well within the ambit of the invention to utilize other external heat sources, such as an accidental fire or furnace. In an automotive setting, with respect to solar heating, the cover 10 and actuator 12 are preferably positioned and configured to overlay the front windshield 26 of the vehicle 16 (FIGS. 1-8), as it is appreciated that it is through this vehicular glazing that the predominant portion of the radiant energy responsible for heating (or degrading the materials of) occupant engaging surfaces typically flows.

The inventive methods of operation include securing the cover 10 relative to the source 14 (e.g., the Sun) such that the actuator 12 is exposed and thermally coupled thereto. As shown in the illustrated embodiment, the actuator 12 may abut the top edge 26a of the windshield, so that on clear days it is exposed to the Sun 14. For example, the hood 28 of the vehicle may define a substantially enclosed interior space 30 adjacent the edge 26a that is configured to receive the cover 10, scroll 20, and actuator 12. A slot opening 32 is defined adjacent the space 30 and configured to allow the ingress and egress of the cover 10. The preferred cover 10 includes a distal edge bead 10b or rubber stop configured to engage and seal the opening 32, when the cover 10 is in the fully retracted position (FIG. 2a). The outer panel 34 of the hood includes an exterior transparent section 36 that allows radiant heat energy to pass through to the space 30. The actuator 12 and hood 24 are cooperatively configured such that when the scroll 20 is secured in the space 30, the element 18 is positioned substantially adjacent (e.g., within 5 mm of) the section 36 (compare, FIGS. 4 and 6 (element placement)).

At this location, the element 18 can be heated from a first and to a second temperature by the Sun 14. It is appreciated that heating by the Sun can be performed in various ways, including for example, by directly heating the element 18, by heating a fluid in which the actuator 12 is immersed, by conduction from surrounding material, or by heating of a pyroelectric element the current generated thereby being used to resistively heat the SMA actuator. At the second temperature the element 18 is caused to undergo a change in physical property, as is known in the art. For example, where the element 18 is an SMA wire, the second temperature may be the austenite finish temperature of the material, such that the change results in a modification of the wire shape or length. As a result of the change, the cover 10 is deployed directly by the action of the element 18, or indirectly by releasing stored energy (e.g., releasing a biased spring, elevated weight, etc.). It is appreciated that for the elongated cylindrical configuration presented in the illustrated embodiment, releasing a biased spring configured to convert its linear motion into a large rotational displacement of the scroll 20 and cover 10 is suitable. For example, the active-material based actuator embodied by FIG. 5 of the 744-Application can be utilized.

Once deployed, the actuator 12 may be configured such that the maintained change in the activated element 18 retains the cover 10 in either the partially or fully deployed condition (represented by positions 2 and 3 in FIG. 2, respectively). Alternatively, a locking mechanism, such as a locking pin 38 (FIG. 7), may be triggered to hold the cover 10 in the deployed condition. Examples of locking and release mechanisms include a locking mechanism having a latch on one movable member (e.g., an edge strip of the cover) that is configured to slide into a slot of an adjacent member (e.g., an interior hood panel). A separate release member can be actuated to push the latch out of the slot, thus releasing the two members from one another.

A preferred method of operation further includes automatically stowing the cover 10 after deployment for a predetermined period or the occurrence of an event (e.g., cessation of solar loading), by the reversing action of the active material element 18. More particularly, the actuator 12 may be configured such that when the element 18 has cooled to a third temperature less than the second and undergone a reversal of the change, the cover 10 is caused to retract about the scroll 20. Where the element 18 is an SMA wire, the third temperature may represent the martensite finish temperature. It is appreciated that provisions for retracting the cover 10 as a result of the cooling of the element 18 are also presented in the various embodiments of the 744-Application.

Alternatively, the method may include electrically activating a retracting mechanism (not shown) drivenly coupled to the charge system (not shown) of the vehicle 16. For example, an input device 40, such as a switch or button, may be conveniently located within the interior compartment, so that the occupant can deliver input upon demand. In a preferred method, the retracting mechanism may be activated by the establishment of an open circuit, wherein electrical contact leads (also not shown) are attached to the door 42 and doorframe 44 of the vehicle, the leads are brought to engage and close a charged circuit by closing the door 42, and opening the door 42 results in the open circuit.

In a related aspect of the invention, it is certainly preferable for the performance of full deployment methods to be selectively enabled, for example, by engaging the emergency parking brake, shifting the gear shift into park, or removing the keys from the ignition switch. To that end, the preferred controller 22 is communicatively coupled to one or more of these vehicular components.

In a preferred method of operation, the radiant heat energy may be focused through at least one lens or prism 46 preferably defined by the transparent hood section 36, so as to accelerate the heating of the element 18 (FIG. 3). The lens 46 preferably presents a double convex configuration and a continuous longitudinal length congruent to the exposed portion of the element 18. As shown in FIG. 3, the lens 46 is preferably configuration so that the element 18 is positioned at its principal focal length (i.e., the point of convergence).

In a preferred method of operation, the actuator 12 includes and the element 18 is immersed in a fluid 48 having a high heat capacity (FIG. 4). The fluid is exposed to the source 14 so as to be initially or concurrently heated with the element 18. The higher heat capacity of the fluid enables the element 18 to retain a greater quantity of heat energy and achieve higher average temperatures than ambient-air adjacent configurations. The fluid 48 is also thermally conductive so as to readily transfer its stored heat energy to the element 18. As such, in this configuration, the element 18 is further heated by the pre-heated fluid, irrespective of current exposure to the source 14. A sample fluid suitable for use in this configuration is any that is currently used as an engine coolant.

Similarly, a preferred method may further include heating the element 18 through conduction, wherein the element 18 is brought to engage at least one solar heat absorbing panel 50, and the panel 50 has been previously heated by the source 14. In this configuration, the transparent section 36 may be replaced by the solar panel 50, as shown in FIG. 5. A suitable material for constructing the panel 50 can take many forms including but not limited to the sheet metal forming the exterior surface of the vehicle. As previously, mentioned the panel 50 may present a pyroelectric element operable to convert heat energy into an electric current. In this configuration the panel is further connected to the element 18 by at least one electrical lead having first and second electrodes interconnecting the lead and element 18 at the ends.

In a preferred method of operation, the controller 22 includes a timer 52 (FIG. 2), and is configured to cause the cover 10 to deploy only after determining a change in the element 18 and after a delay period following the determination of the change. For example, the period may be determined based on a minimum period needed to achieve undesirable interior compartment temperatures, such as 30 minutes during winter months, 5 minutes during summer months, and 15 minutes otherwise. Further, the controller 22 may be communicatively coupled to at least one sensor 54 and configured to transmit a signal (or data) to the actuator 12 only after receiving certain feedback from the sensor 54 or occupant 24. For example, as shown in FIG. 2, the vehicle 16 may include seat sensors (e.g., load cells, etc.) operable to determine the presence of a seated occupant, and the controller may be configured to withhold transmission of an activation signal to the actuator 12 when an occupant is detected, so that the cover 10 is not deployed.

In the preferred method of operation shown in FIGS. 6 and 6a, the active material actuator 12 is further configured to cause opposite grips 56 to attach the cover 10 to at least one front windshield wiper 58 of the vehicle. The grip 56 functions similarly to the grips shown in FIGS. 1 and 2 (reference label 6 therein) of the 744-Application for attaching the cover to a translatable window. That is to say, when the wiper 58 is in the recessed position, the grips 56 are caused to move away from each other, when the active material element 18 is actuated, so as to engage the ends of a race 60 defined by the wiper. Once engaged with the wiper 58, the cover 10 is deployed by causing at least the attached portion of the wiper 58 to swing to a deployed position, and more preferably, to swing ninety-degrees to a vertically oriented position. Alternatively, a plurality of clasping grips (not shown) may be utilized in a preferred method to attach the cover 10 to the wiper.

In another preferred method, the heat source is drivenly coupled to a ratcheting mechanism (i.e., ratchet) comprising an active material component (as described in the 744-Application) that is in turn drivenly coupled to the cover 10. The ratchet mechanism is preferably configured to perform at least one action selected from the group consisting of lift a dead weight, stretch a linear spring, wind-up a torsional spring, and combinations comprising at least one of the foregoing actions. The ratchet mechanism is preferably configured such that once the action is performed, the ratchet mechanism can be releasably latched. The release of the latch can allow full stroke in a single action. The energy could be stored between customer requested activations to allow the provision of a full stroke upon request.

Finally, in yet another preferred method (FIGS. 7 and 8), an obscuring element 62 is configured to block the exposure of the actuator 12 from the heat source 14 when the cover 10 is deployed, so as to cause the AM element 18 to cool and revert back to its Martensitic state. In this state, the release of the locking pin 38 will cause stored energy such as in a biasing spring or suspended weight to retract and stow the cover 10, so as to engage the next set of teeth on the ratchet (where utilized). Once the obscuring element 62 is removed and the cover 10 is stowed, the actuator 12 is re-exposable to and therefore able to be re-heated by the source 14, so as to result in a cyclical process. Thus, the panel 64 is preferably configured to completely overlay the AM element 18. In the illustrated embodiment, the obscuring element 62 includes a short panel 64 that is attached to the cover 10 or scroll 20 and embedded with flexible shape memory strands 66. The panel 64 is positioned, for example, by a spring-biased guide 68 configured to engage the outer roll of the cover 10 as it deploys (FIG. 2a). When the distal edge of the panel 64 is encountered, the rotation of the scroll 20 and the guide 68 cooperatively cause the panel 64 to separate from the cover roll and travel towards the transparent section 36 (FIG. 7). The preferred panel 64 is accordion in type and interwoven to the strands 66, such that the panel 64 is caused to collapse away from and thereby re-expose the element 18 when the strands 66 are activated (FIG. 8). In this configuration, the shape memory material of the strands 66 performs all of the work directly, thereby eliminating the need for numerous parts to store the energy for subsequent release.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A method of deploying a vehicular cover having an active material based actuator utilizing an external heat source spaced from the cover and actuator, said method comprising the steps of:
   a. securing the cover relative to the source such that at least a portion of the actuator is thermally coupled to the source, said at least portion presenting a first temperature;
   b. securing the cover relative to a space and/or surface;
   c. heating said at least portion with the heat source, so as to achieve a second temperature and cause a change in a physical property of the actuator; and
   d. deploying the cover as a result of the change when the second temperature is achieved, so as to modify the space and/or block access to the surface, wherein the actuator is communicatively coupled to at least one sensor and a controller cooperatively configured to selectively transmit data to the actuator, and step c) further includes the steps of autonomously deploying the cover only after receiving the data.

2. The method as claimed in claim 1, wherein the heat source is the sun, the actuator is exposed and thermally coupled to radiant heat energy provided thereby, and step a) further includes securing the cover relative to at least one glazing region defining an area of radiation transparency, so as to prevent the transmission of radiation through at least a portion of the area when deployed.

3. The method as claimed in claim 1, further comprising step:
   e. autonomously occluding said at least portion from the heat source, so as to allow the actuator to cool to a third temperature less than the second whereat the change is reversed, and autonomously stowing the cover as a result of the reversal, when the third temperature is achieved.

4. A method of deploying a cover utilizing an external heat source spaced from the cover, wherein said cover is adapted for use with a vehicle presenting at least one glazing and defining an interior compartment, and includes an active-material based actuator communicatively coupled to the compartment, said method comprising the steps of:
   a. securing the cover relative to the source such that the actuator is exposed and thermally coupled to the source, said actuator presenting a first temperature;
   b. heating the actuator with the heat source, so as to achieve a second temperature whereat the actuator is caused to undergo a change in physical property;
   c. autonomously sensing a condition status within the compartment and conveying the condition to the actuator; and
   d. selectively deploying the cover as a result of the change, when the second temperature is achieved, based on the condition status.

* * * * *